United States Patent
Bock et al.

(10) Patent No.: US 8,761,247 B2
(45) Date of Patent: Jun. 24, 2014

(54) ADAPTIVE QUANTIZATION BASED ON SPATIAL ACTIVITY HISTOGRAM

(75) Inventors: Alois Martin Bock, Hampshire (GB); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/140,172

(22) PCT Filed: Dec. 17, 2008

(86) PCT No.: PCT/EP2008/067716
§ 371 (c)(1), (2), (4) Date: Jun. 16, 2011

(87) PCT Pub. No.: WO2010/069366
PCT Pub. Date: Jun. 24, 2010

(65) Prior Publication Data
US 2011/0249727 A1    Oct. 13, 2011

(51) Int. Cl.
*H04N 7/12* (2006.01)
*H04N 11/02* (2006.01)

(52) U.S. Cl.
CPC . *H04N 7/12* (2013.01); *H04N 11/02* (2013.01)
USPC ............. 375/240.03; 382/232; 375/240.02

(58) Field of Classification Search
CPC .................................. H04N 7/12; G06K 9/36
USPC .................................................. 375/240.03
See application file for complete search history.

(56) References Cited

U.S. PATENT DOCUMENTS

| 2003/0169811 | A1 | 9/2003 | Kitamura et al. | |
| 2005/0152449 | A1* | 7/2005 | Nemiroff et al. | 375/240.03 |
| 2008/0123738 | A1* | 5/2008 | Katsavounidis et al. | 375/240.01 |
| 2008/0165845 | A1* | 7/2008 | Singh et al. | 375/240.03 |
| 2009/0110063 | A1* | 4/2009 | Nakayama | 375/240.03 |

FOREIGN PATENT DOCUMENTS

EP    1 988 718    11/2008

OTHER PUBLICATIONS

International Search Report for PCT/EP2008/067716, mailed Oct. 27, 2009.
Weisstein et al., "Pearson's Skewness Coefficients", [Online], Oct. 4, 2009, 1 pg.
Chung et al., "A Quantization Control for MPEG2 Compatible Image Quality Improvement", *IEEE International Conference*, Jun. 21, 1994, pp. 142-143.

* cited by examiner

*Primary Examiner* — Jessica Prince
(74) *Attorney, Agent, or Firm* — Nixon & Vanderhye, P.C.

(57) ABSTRACT

There is provided a method of adapting a Quantization parameter of digitally encoded video, comprising calculating spatial activity values of macroblocks in a picture of interest, creating a histogram of the spatial activity values, determining a change of quantization parameter value for a low activity category ΔQPLA from a skewness parameter of the histogram. There is also provided an apparatus for carrying out the method, and a computer readable product carrying instructions which when executed carry out the method.

19 Claims, 4 Drawing Sheets

ADAPTIVE QUANTIZATION BASED ON SPATIAL ACTIVITY HISTOGRAM

This application is the U.S. national phase of International Application No. PCT/EP2008/067716 filed 17 Dec. 2008 which designated the U.S., the entire content of which is hereby incorporated by reference.

TECHNICAL FIELD

The invention is related to video coding in general, and in particular to pre-processing video signals to provide Adaptive Quantization control.

BACKGROUND

In video compression encoders, control of a degree of quantisation is an important means of controlling the coding process in order to match the capacity demands of the picture behaviour with the available output bit rate. A key parameter used extensively in current coding methods for practical compression applications (e.g. MPEG-2 and MPEG-4/H.264) is the Quantisation Parameter (Qp). Since an increased Qp value results in lower bit rates for the digital video bit stream, for a low target bit rate the value of Qp is at the high end of its nominal range (1 to 31 in MPEG-2, and 0 to 51 in MPEG-4/H.264). Conversely, where bit rate is not severely constrained, a value nearer to the lower end is chosen.

The process linking the target bit rate and the coding process, in particular the value of Qp, is known as Rate Control. The value of Qp is variable within each picture down to the level of a macroblock, but in simple coding implementations is often constant over a whole picture (i.e. non-adaptive quantization) and set at the value suggested by Rate Control. The result of such a simple implementation is that all the macroblocks in a picture contain a similar amount of distortion noise after decoding, regardless of how the macroblocks content and location can cover up the distortion, i.e. the choice of quantization parameter is done regardless of the behaviour of the image and without any recognition of the visible effect of the resultant coding distortions.

Adaptive quantisation, on the other hand, is used to distribute bit allocations within a picture without interfering with the Rate Control algorithm. In general, the picture quality can be improved by reducing the amount of quantisation in picture areas of lower spatial activity where the human visual system (HVS) can detect distortion more easily, whereas higher spatial activities are less affected by coarser quantisation because the HVS is less sensitive in picture regions with such high activity levels. However, while some picture sequences benefit from aggressive adaptive quantisation (i.e. large deviations from the average quantisation measured over the whole picture), others are better with little or no adaptive quantisation. This implies that some degree of control is necessary to adapt the value of Qp in a beneficial manner.

Adaptive Quantization is not a new idea and is in common use, but the prior art methods of Adaptive Quantization have been complex and hence costly to implement in terms of delays introduced into the video encoding pathway, or physical cost/size of the hardware required. Accordingly, the present invention seeks to describe a simple and cost effective method for controlling the aggression of adaptive quantisation.

SUMMARY

Embodiments of the present invention provide a method of adapting a Quantization parameter for digitally encoding video, comprising calculating spatial activity values of macroblocks in a picture of interest, creating a histogram of the spatial activity values, determining a change of quantization parameter value for a low activity category of macroblocks, $\Delta QPLA$, from a skewness parameter of the histogram.

In this way, the Adaptive Quantization method according to embodiments of the present invention is reduced in complexity, whilst still maintaining the quality of video, with minimum visible distortion.

Optionally, the skewness parameter is determined from a calculation of the absolute difference between a histogram mean value and a histogram median value.

Optionally, the step of deriving the change of quantization parameter value for a low activity category further comprises applying a scale factor, B, to the absolute difference between a histogram mean value and a histogram median value.

Optionally, the step of deriving the change of quantization parameter value for a low activity category further comprises applying an offset value, A, to the absolute difference between a histogram mean value and a histogram median value.

Application of an offset means there is always some level of adaptation being applied.

Optionally, the skewness parameter is determined from the absolute difference between an average activity of the high activity category macroblocks in a picture of interest and an average activity of the low activity category macroblocks in the picture of interest.

Optionally, the method further comprises applying a scale factor, C, to the absolute difference between an average activity of the high activity category macroblocks in a picture of interest and an average activity of the low activity category macroblocks in the picture of interest.

Optionally, the method further comprises determining a change of quantization parameter value for a high activity category of macroblocks, $\Delta QPHA$, from a video bit rate set by a video Rate Control and the calculated change of quantization parameter value for a low activity category of macroblocks, $\Delta QPLA$.

Optionally, the video is to be encoded according to the MPEG-4/H.264 standard, and a change of quantization parameter value for a high activity category is calculated from the equation:

$$\Delta QPHA = \text{Int}\left[-6 * \log\left(\frac{100 - pcLA * 2^{\Delta QPLA/6}}{100 - pcLA}\right) \Big/ \log(2) + D\right]$$

wherein D is an offset value and pcLA is a percentage of the total number of macroblocks in the picture of interest assigned to the low activity category.

Optionally, the method further comprises providing a third, normal, activity category between the low and high activity categories, and the change in quantization parameter for the normal category is zero.

Optionally, for a 16 by 16 macroblock the macroblock activity is calculated using the equation:

$$\text{Activity} = \frac{1}{128}\left[\sum_{x=0}^{14}\sum_{y=0}^{15}|Y_{x,y} - Y_{x+1,y}| + \sum_{x=0}^{15}\sum_{y=0}^{14}|Y_{x,y} - Y_{x,y+1}|\right]$$

wherein $Y_{x,y}$ are 8 bit luminance pixel values within a macroblock.

Optionally, for the case of there being two activity categories, the low activity category is set to be 30% of the total number of macroblocks in the picture of interest and the high activity category is set to be the remaining 70% of the total number of macroblocks in the picture of interest. Alternatively, for the case where there are three activity categories, the low activity category is set to be (the lower) 25% of the total number of macroblocks in the picture of interest, the 'normal' activity category is set to be the next 10% of the total number of macroblocks in the picture of interest and the high activity category is set to be the remaining 65% of the total number of macroblocks in the picture of interest. Other category sizes may be used in particular circumstances.

Optionally, the offset value A is 2, the scale factor B is 0.5, the scale factor C is 2, and the offset value D is 0.5.

Embodiments of the present invention also provide an Adaptive Quantizer adapted to carry out any of the described method and particularly comprises a macroblock activity calculator, and $\Delta$ (change in) quantization parameter circuit in communication with the macroblock activity calculator, for providing a change of quantization parameter (Qp) control signal to a video encoder.

Optionally, the Adaptive Quantizer may further comprises a histogram calculation circuit between the macroblock activity calculator and the $\Delta$ quantization parameter circuit.

Embodiments of the present invention also provide a computer-readable medium, carrying instructions, which, when executed by one or more processors, causes said processors to carry out any of the described Adaptive Quantization method.

BRIEF DESCRIPTION OF THE DRAWINGS

A method of providing Adaptive Quantization of digital video will now be described, by way of example only, with reference to the accompanying drawings in which.

DETAILED DESCRIPTION

An embodiment of the invention will now be described with reference to the accompanying drawings in which the same or similar parts or steps have been given the same or similar reference numerals.

Adaptive Quantisation is only fully effective if its control is skillfully applied so that the sharing of the bit budget is optimal in maximising picture quality. In the ultimate extreme, this needs sophisticated picture behaviour analysis and an effective control method. However, in some applications of compression techniques, constraints apply so that full exploitation of complex Adaptive Quantization control techniques of the prior art is not possible. Nevertheless, in these constrained situations, picture quality targets still remain high.

An example of such a situation is in professional television production and broadcast, where a very low coding latency is required to facilitate live interviews between studios and remote locations without the awkward effects of two way delays being apparent. This constraint minimises the number of delay elements allowed in the signal path and thus removes any significant benefit from knowledge of the picture behaviour in advance of its coding, which is how known complex Adaptive Quantization techniques operate. This is to say, in such low latency environments, it is not possible to use accurate calculations of suitable QP values determined from thorough analysis of a delayed version of the video picture data.

Typically, picture behaviour analysis benefits from such a look-ahead facility in the method, but this clearly costs delay of at least one television frame/field period. It is desirable to avoid this delay but still achieve high performance in adapting the quantisation of the picture in an optimal fashion. Similarly, it is desirable to achieve this high performance with minimal hardware and software complication and therefore cost in the implementation of the method, and to approach if not equal the best performance of more complex methods using look-ahead techniques. Whilst still effective acting alone, the herein described method can be combined with other Adaptive Quantisation methods using more coding resources, in order to improve the efficiency of an overall system featuring the combined methods.

Typical pictures (i.e. frames or fields) in a television sequence vary considerably in complexity and so present a challenge to compress with ultimate efficiency. Visible compression artefacts can be minimized by combining an effective metric system that provides appropriate measures of image complexity with a control mechanism that distributes coding distortion such that the distortion is directed to parts of the picture where it is most readily masked or hidden. Thus, the activity of a small region of the picture, typically a macroblock, is measured and if the disparity among the pixel values is large then this macroblock is labelled as comprising a high level of activity. Conversely, a macroblock with a relatively small variation in pixel values will be designated as having low activity. These measures then guide a control process, as described in more detail below, to choose a quantisation parameter value for each macroblock that deviates appropriately from the overall picture average, as set by a separate Rate Control process that defines a global picture bit budget, thus distributing the distortion to where it is least visible.

For the purpose of describing the Adaptive Quantisation control method according to the exemplary embodiments of the present invention, the spatial activity of a 16×16 macroblock is defined as follows:

$$\text{Activity} = \frac{1}{128}\left[\sum_{x=0}^{14}\sum_{y=0}^{15}|Y_{x,y} - Y_{x+1,y}| + \sum_{x=0}^{15}\sum_{y=0}^{14}|Y_{x,y} - Y_{x,y+1}|\right] \quad (1)$$

Where $Y_{x,y}$ are the 8 bit luminance pixel values within the target macroblock.

However, alternative measures of spatial activity may be used instead, such as the several spatial activity measures in use today. For example:

$$\text{Activity} = \frac{1}{128}\sum_{i=0}^{255}|Y_i - Y_{mean}|$$

The form of spatial activity shown in equation (1) is calculated for all macroblocks within a picture, and a histogram of the calculated spatial activity values is generated for each picture. A picture can be a field or a frame of a video sequence. The spatial activity is divided by 128 in equation (1) above so that the histogram range can be limited to one that is conveniently represented by an 8 bit number. However, the final bit limitation step is optional.

Figure 1:
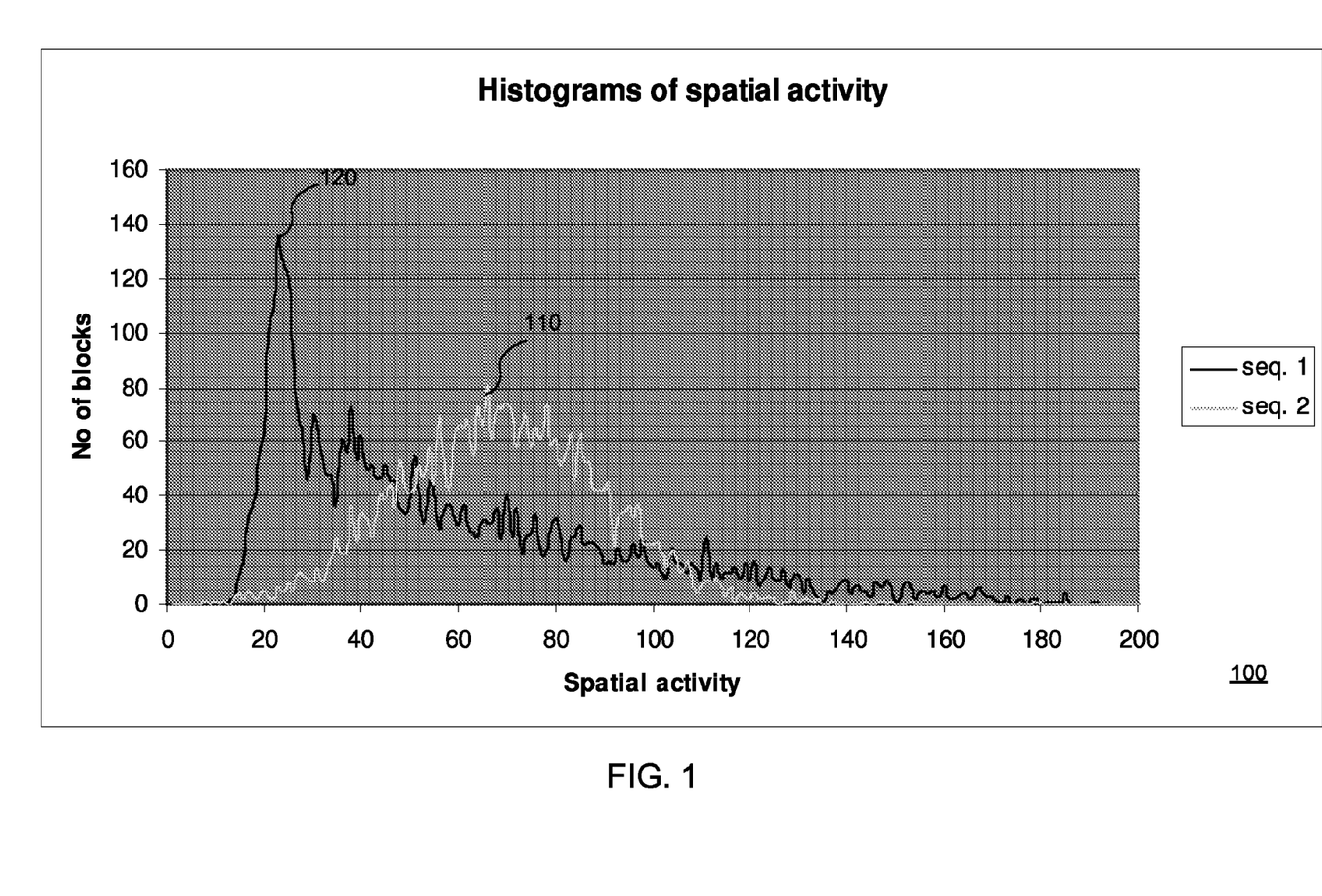
FIG. 1 shows two different exemplary forms of spatial activity histograms of video pictures.

The above spatial activity calculation is typically calculated by hardware adapted for the purpose, and which is also adapted to accumulate the results together to form a histogram (example as shown in FIG. 1) on the fly, using a number of histogram bins. This type of hardware implementation reduces any delay in providing the information from which the Adaptive Quantization process operates.

The shape of the histogram provides an indication of the nature of the current picture, which can then be used to determine the strength of Adaptive Quantisation that should be applied. Pictures with large areas of low level texture (e.g. grass on a football pitch) and high contrast areas (e.g. the crowd in a football stadium) have been shown by experiment to benefit from strong (i.e. aggressive) adaptive quantisation to improve the overall picture quality. This is to say, pictures having large areas of low level texture together with some high contrast areas benefit from large deviations in the Qp values used across the macroblocks forming that picture.

Such pictures have been shown to exhibit a highly skewed activity histogram. That is, the picture behaviour comprises activity that is concentrated around a specific large value of the activity metric of equation 1 (see sequence 1, 120, of FIG. 1).

On the other hand, pictures which produce a more symmetric and uniformly distributed histogram require little or no adaptive quantisation, because the value of Qp set by the rate control is already near the correct one.

If the picture histograms were more or less constant, then no adaptation would be required. But this is rarely the case in real life video, where skewed histograms are common, and the more the histogram is skewed, the stronger the adaptive quantisation that should be applied.

FIG. 1 illustrates examples of a first skewed activity histogram sequence 120 and a second symmetric activity histogram sequence 110. Accordingly, it is proposed here that a measure of this skewness of the histogram can be used as a primary parameter in controlling the degree of adaption of Qp.

Furthermore, because it is desirable to minimise the complexity of implementation, a simple statistical measure of skewness needs to be found that still provides the required level of performance.

One simple and convenient way that the skewness of the histogram can be calculated is by taking the difference between the mean and the median value of the spatial activity distribution. It has been found by experiment that this is an effective method. Other methods of measuring the skewness may equally be used.

Figure 2:
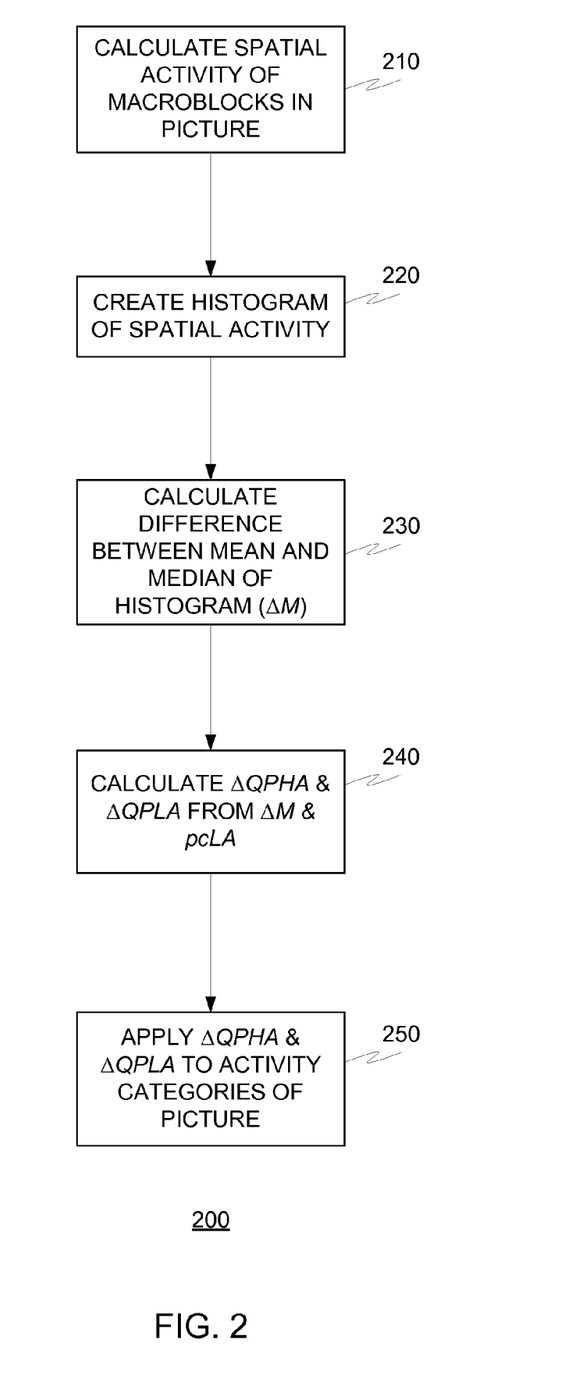
FIG. 2 shows a method of adapting the quantization parameter of an encoded digital video according to a first embodiment of the present invention.

A flow diagram of the method according to a first embodiment of the invention 200 is shown in FIG. 2.

The method begins by calculating the spatial activity of the macroblocks in the input picture of interest at step 210. A histogram of the calculated activities is created at step 220. In typical real-life implementations, the histogram is produced from the individual macroblock calculations on the fly, for example, by using a 200 bin histogram circuit on the output of a macroblock activity calculation circuit.

At step 230 the mean and median values of the activity histogram for the picture of interest are calculated, from which the absolute difference between the mean and median values is subsequently calculated (ΔM). The mean is the average macroblock activity value across the macroblocks in the histogram, while the median is the activity of the macroblock at the position midway between the first and last macroblocks of the histogram, which are ranked in order of activity. The median number is most readily derived from the activity histogram by counting the number of macroblocks from zero activity upwards until 50 percent of macroblocks is reached.

At step 240, the change in the quantization parameter for the high activity and low activity categories are derived from the absolute difference between the mean and median value calculated at step 230. For example, using the two examples shown in FIG. 1, sequence 1, 120, has a mean activity of 57 and a median activity of 47 whereas the mean and median activity of sequence 2, 110, are both 68. Therefore, the differences in mean and median activity (ΔM) for sequence 1 and 2 are 10 and 0 respectively. These raw ΔM values are not typically used directly to control the Adaptive Quantization, but the control values are derived from them with reference to the Rate Control, as described in more detail below.

At step 250, the calculated changes in the quantization parameter for the high activity and low activity categories are applied to macroblocks of the respective category in the picture in order to reduce the visible distortion in the picture for a given bit rate.

Control of the Bit Allocation:

As has been mentioned above, Adaptive Quantisation should not affect the overall number of bits spent on a picture, because it should not affect the performance of Rate Control. Therefore, if some picture areas are assigned a lower quantisation parameter, Qp, than would be indicated by the rate control, other picture areas should be set to a higher quantisation parameter in order to keep the overall bit rate allocation (and hence size) of the picture the same.

If the relationship between quantisation and bit rate is known from the Rate Control process, then it is possible to calculate the re-distribution of the picture using the picture bit allocations among the macroblocks. A greater level of quantisation than the average determined from Rate Control should be used for the areas of higher spatial activity, in order to compensate for the higher bit allocations (i.e. lower quantization) used in the areas of low spatial activity, where coding distortion is most visible.

As an example, in MPEG-4/H.264, where the relationship between bit rate and Qp is defined, the bit rate and therefore the bit allocation doubles every time the quantisation parameter is reduced by 6. Therefore, the bit cost difference resulting from applying different QPs can be estimated using the following formula:

$$B = Bits \cdot 2^{\left(\frac{-\Delta Qp}{6}\right)} \qquad (2)$$

Where ΔQp is the difference in Qp.

The above equation (2) shows that if a set of macroblocks at a quantization parameter value of Qp results in X bits for the picture, then a quantization parameter change of ΔQp=−6 would generate 2*X bits.

For the simple case where the picture is divided into just two spatial activity categories, then the two quantisation parameters can be calculated as shown in equation (3) below. Assuming that the quantisation parameter for a certain percentage of macroblocks is reduced by a given amount, then the increase of the quantisation parameter for the remaining macroblocks can be calculated as follows:

$$\Delta QPHA = \text{Int}\left[-6*\log\left(\frac{100 - pcLA*2^{\Delta QPLA/6}}{100 - pcLA}\right)/\log(2) + 0.5\right] \quad (3)$$

Where: ΔQPHA is the increase of quantisation in the high activity area;

ΔQPLA is the decrease of quantisation in the low activity area;

pcLA is the percentage of macroblocks with low spatial activity;

Int[ ] is a function that rounds down to the nearest integer value.

The final 0.5 value is used to correct rounding errors resultant from using the Int[ ] function, because the calculation is floating point whereas ΔQPHA is an integer number.

Equation (3) is illustrative and applies to H.264 only. For other compression standards (e.g. MPEG-2), the relationship between quantisation and bit rate has to be determined from the Rate Control in use with that compression standard before the relevant equation that links ΔQPHA, ΔQPLA, and pcLA can be known, and hence quantisation parameters can be calculated. Where a particular compression standard has a more complex relationship between bit rate and Qp, a lookup table of values may be used.

In equation (3) ΔQPLA and ΔQPHA determine the strength of adaptive quantisation applied, i.e. the degree to which the value of the quantisation parameter Qp is changed for low and high areas of activity, respectively. ΔQPLA can be derived from the adaptation control factor mean-median activity as illustrated by equation (4) below which, in turn, allows ΔQPHA to be calculated according to equation (3) above.

To achieve a significant improvement in picture quality, the percentage of macroblocks with low Qp (i.e. pcLA) is set to a value of between 15% and 40%. A value of approximately 30 percent has been determined by experiment to be most advantageous, but given other applications this percentage value may be different.

Given a pcLA of 30%, the threshold between the low and high-activity categories is readily derived from the activity histogram by counting the number of macroblocks from zero activity upwards until 30 percent of macroblocks is reached. The activity at which 30 percent of macroblocks is reached determines the threshold between low and high activity categories. The quantisation parameter of all macroblocks below that activity level is reduced by ΔQPLA whereas the quantisation parameter of the remaining macroblocks is increased by ΔQPHA.

Since equation (3) calculates ΔQPHA as a function of ΔQPLA (the reduction in Qp) and pcLA (the % of macroblocks with low QP), although in the above case more macroblocks are getting an increased Qp value than are getting a reduced Qp value, the overall bit rate for the video does not change significantly, because the increase is smaller than the reduction.

ΔQPLA can be derived from control factor mean-median activity (ΔM) as illustrated in equation (4).

$$\Delta QPLA = A + B |\text{mean\_activity} - \text{median\_activity}| \quad (4)$$

In equation (4), the constant A is used to provide a low level of adaptive quantisation even if the absolute difference between mean and median activity is zero. Factor B is used to scale the absolute difference between mean and median activity to an appropriate level of ΔQPLA. Based on the activity calculation for H.264 defined in equation (1), appropriate values for A and B have been found by experiment to be 2 and 0.5 respectively.

Figure 3:
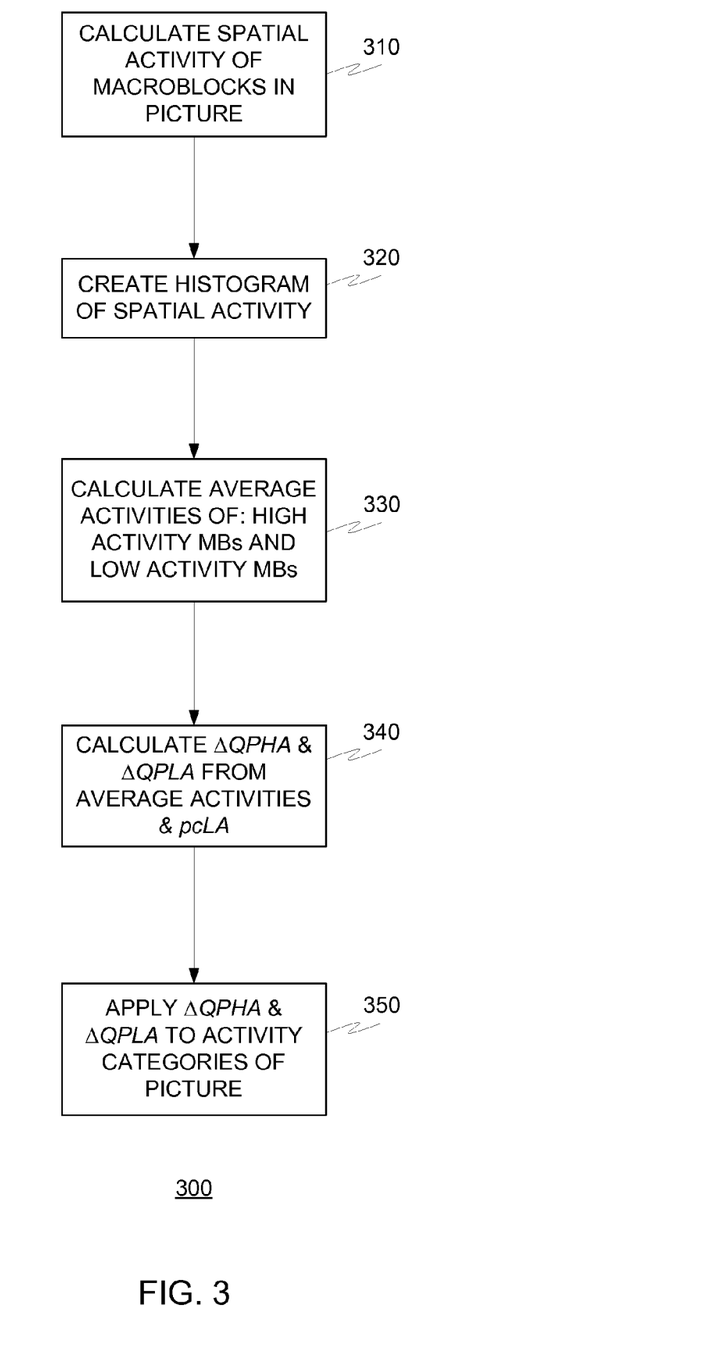
FIG. 3 shows a method of adapting the quantization parameter of an encoded digital video according to a second embodiment of the present invention.

FIG. 3 shows a second embodiment of the present invention, in which an alternative method 300 of calculating ΔQPLA calculated macroblock activities is used.

In overview, the method again starts with the same first two steps of: calculating spatial activities of the macroblocks in the picture of interest at step 310, for example by using equation (1), and creating a histogram of the results at step 320. The histogram is used to distinguish between high and low activity macroblocks.

At step 330, the average of the low activity macroblocks and the average of the high activity macroblocks are calculated (i.e. the average of the lower 30%, and the upper 70% in the example given above, respectively). ΔQPLA is then calculated from these averages as shown in equation (5):

$$\Delta QPLA = C\left(\frac{\sum_{i \in High} ActivityMB_i}{NrMacroblocksHigh} - \frac{\sum_{i \in Low} ActivityMB_i}{NrMacroblocksLow}\right) \quad (5)$$

In this case ΔQPLA is derived from the difference between the average activity of high activity macroblocks minus the average activity of low activity macroblocks. Based on the activity calculation for H.264 defined in equation (1), an appropriate value for C has been found by experiment to be 0.2.

Meanwhile ΔQPHA is calculated from equation (3) using ΔQPLA calculated from equation (5).

In the same way as the first embodiment, at step 350 the calculated ΔQPLA and ΔQPHA values are applied to macroblocks of the picture in the respective activity categories in order to adapt their QP value, and hence improve the output video distortion characteristics for a given bit rate.

Extension to More than Two Categories of Activity:

The method described above to keep the overall number of bits spent on a picture the same throughout the Adaptive Quantization process can be extended to more than two categories by using an iterative process. For example, to reduce the potential visibility of fluctuations between high and low activity areas, especially in neighbouring macroblocks, it is advantageous to insert a third category of activity inbetween the low and high activity areas. This third category comprises those macroblocks having activity values greater than the maximum activity in the low category but less than the minimum activity in the high category. The optimum value of ΔQP for this middle category of activity is zero (i.e. no change). In this configuration, this third middle category is termed the 'Normal' category.

The Normal category is typically set to lie between 25 and 35 percent of the total number of macroblocks for the picture of interest, hence the low category comprises those macroblocks with low activity and is set at 25 percent of all macroblocks, and with those remaining (65%) being designated as high activity.

In this situation ΔQPLA is used only on the 25 percent of macroblocks that have the lowest activity values, whereas ΔQPHA is applied to the 65 percent of macroblocks that have the highest activity. The calculation of ΔQPLA remains as defined in either of equations (4) or (5), and ΔQPHA remains as defined in equation (3).

The aforementioned Adaptive Quantization method is typically carried out in a video pre-processor stage before the coding stage proper. However, it may be performed as part of the video encoding itself. In the case where the method is carried out by the video pre-processor, the pre-processor analyses video picture data prior to encoding proper, to determine the optimum adaptive quantization parameter Qp to apply in the subsequent encoding step.

Figure 4:
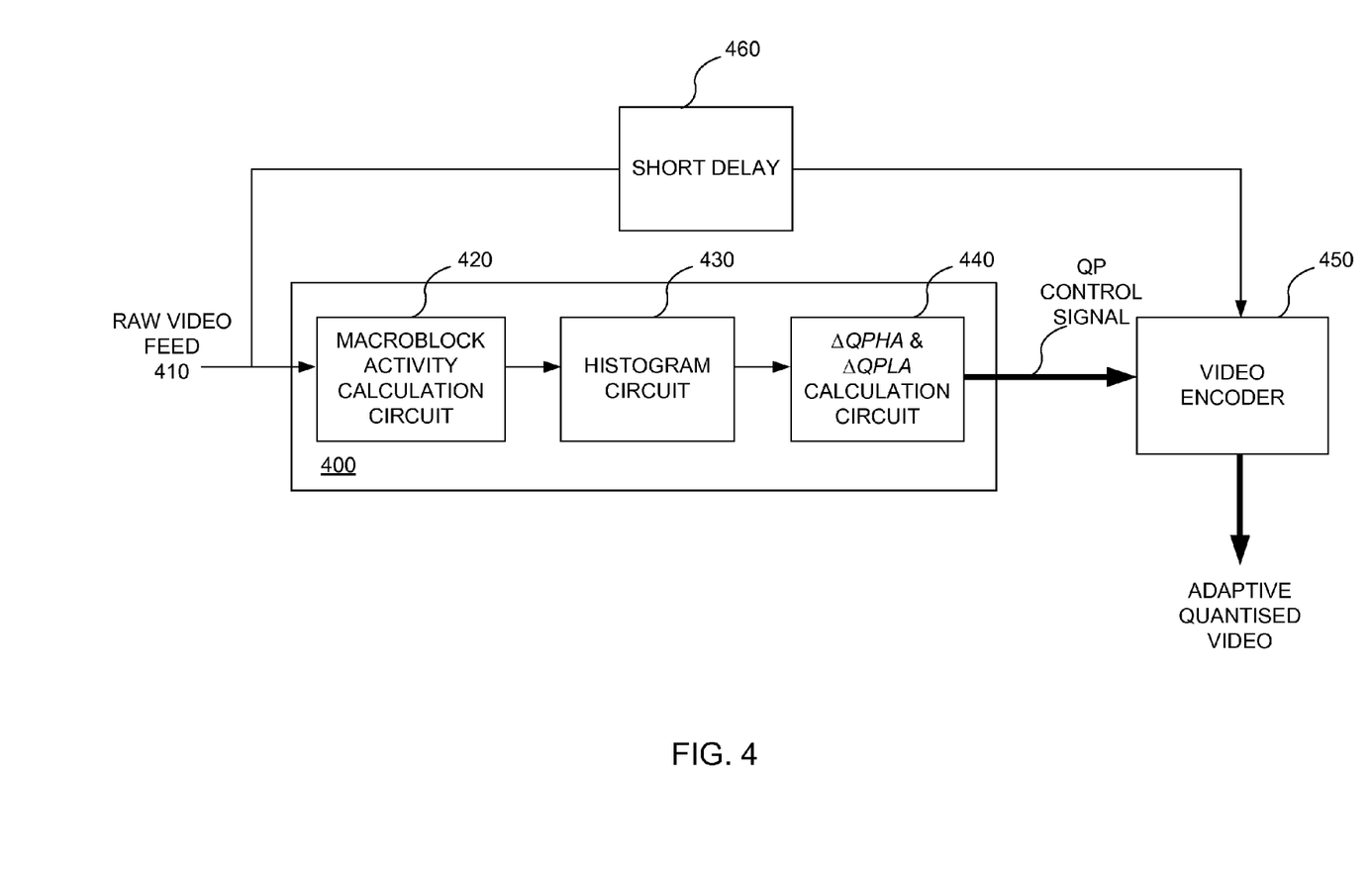
FIG. 4 shows a schematic diagram of hardware adapted to carry out the method according to either the first or second embodiments of the adaptive quantization method.

The above described Adaptive Quantization method may be carried out by suitably adapted hardware, such as an exemplary hardware implementation of an Adaptive Quantizer 400 according to an embodiment of the invention as shown in FIG. 4.

The Adaptive Quantizer 400 is typically located between the raw video input of the overall system 410, and the video encoder 450, where it can apply the above described Adaptive Quantization methods to the raw video, in order to guide the QP values used in the video encoder 450. The video encoder 450 also has a direct input of the raw video to encode, which passes through a short delay 460, in order to keep the input to the video encoder 450 in sync with the relevant QP control signal (i.e. to provide time for the Adaptive Quantizer 400 to operate on the respective video).

The Adaptive Quantizer 400 comprises: a macroblock activity circuit 420, for calculating each macroblock activity, typically according to equation (1); a histogram circuit 430 for calculating histograms of the macroblock activities, the skewness of which are used to determine how the Qp values are adapted; and a ΔQPLA/ΔQPHA calculation circuit 440, which provides the Qp control signal to the video encoder 450, based upon the histograms created.

The Adaptive Quantization method may also be embodied in a set of instructions, stored on a computer readable medium, which when loaded into a computer processor, Digital Signal Processor (DSP) or similar, causes the processor to carry out the hereinbefore described method.

Equally, the method may be embodied as a specially programmed, or hardware designed, integrated circuit which operates to carry out the method on picture data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or location video uplink van supporting an in-the-field news team.

Another exemplary hardware embodiment of the present invention is that of a video pre-processor comprising an Application Specific Integrated Circuit (ASIC).

For some applications of Adaptive Quantisation, implementation issues such as cost and latency dominate and need to be given priority but without loss of picture quality. The above described embodiments of the present invention address this area directly and provide very competitive performance compared to more fully resourced and complex methods such as those in the prior art.

Prior art Adaptive Quantization schemes have used complex methods, whereas embodiments of the present invention apply a simplified approach using a measure of the skewness of the spatial activity histogram to control the degree of aggression of adaptive quantisation, which results in a simpler implementation, but still with a high level of accuracy.

Where the terms "macroblock of interest", "pixel of interest", or "target video sequence" are used herein, it is to mean the macroblock or the pixel currently being processed by the described method, or the video sequence to which the method is currently being applied.

It will be apparent to the skilled person that the exact order and content of the steps carried out in the method described herein may be altered according to the requirements of a particular set of execution parameters, such as speed of encoding, accuracy of detection, and the like. Accordingly, the claim numbering is not to be construed as a strict limitation on the ability to move steps between claims, and as such portions of dependent claims may be utilised freely.

The invention claimed is:

1. A method of adapting a Quantization parameter for digitally encoding video, comprising:
    calculating spatial activity values of macroblocks in a picture of interest;
    creating a histogram of the spatial activity values;
    determining a change of quantization parameter value for a low activity caqtegory, ΔQPLA, from a skewness parameter of the histogram;
    wherein the skewness parameter is determined from a calculation of an absolute difference between a histogram mean value and a histogram median value.

2. The method of claim 1, wherein the step of determining a change of quantization parameter value for a low activity category further comprises:
    applying a scale factor, B, to the absolute difference between the histogram mean value and the histogram median value.

3. The method of claim 1, wherein the step of determining the change of quantization parameter value for a low activity category further comprises:
    applying an offset value, A, to the absolute difference between the histogram mean value and the histogram median value.

4. A non-transitory computer-readable medium, carrying instructions, which, when executed, causes computer logic to carry out the method of claim 1.

5. The method of claim 4, further comprising:
    applying a scale factor, C, to the absolute difference between the average activity of the high activity category macroblocks in the picture of interest and the average activity of the low activity category macroblocks in the picture of interest.

6. The method of claim 1, further comprising:
    determining a change of quantization parameter value for a high activity category ΔQPHA from a video bit rate set by a video Rate Control and the calculated change of quantization parameter value for a low activity category ΔQPLA.

7. The method of claim 1, wherein the video is to be encoded according to the MPEG-4/H.264 standard, and a change of quantization parameter value for a high activity category is calculated from the equation:

$$\Delta QPHA = \text{Int}\left[-6 * \log\left(\frac{100 - pcLA * 2^{\Delta QPLA/6}}{100 - pcLA}\right) \bigg/ \log(2) + D\right]$$

wherein D is an offset value and pcLA is a percentage of the total number of macroblocks in the picture of interest assigned to the low activity category.

8. The method of claim 1, further comprising providing a third, normal, activity category between the low and high activity categories, and the change in quantization parameter for the normal category is zero.

9. The method of claim 1, wherein for a 16 by 16 macroblock, macroblock activity is calculated using the equation:

$$\text{Activity} = \frac{1}{128}\left[\sum_{x=0}^{14}\sum_{y=0}^{15} |Y_{x,y} - Y_{x+1,y}| + \sum_{x=0}^{15}\sum_{y=0}^{14} |Y_{x,y} - Y_{x,y+1}|\right]$$

wherein $V_{x,y}$ are 8 bit luminance pixel values within a macroblock.

10. The method of claim 1, wherein:
for the case of two activity categories, the low activity category is assigned to 30% of the total number of macroblocks in the picture of interest and the high activity category is assigned to the remaining 70% of the total number of macroblocks in the picture of interest;
or for the case of three activity categories, the low activity category is assigned to 25% of the total number of macroblocks in the picture of interest, the normal activity category is assigned to 10% of the total number of macroblocks in the picture of interest and the high activity category is assigned to the remaining 65% of the total number of macroblocks in the picture of interest.

11. A computer-readable medium, carrying non-transitory instructions, which, when executed, causes computer logic to carry out method claim 1.

12. The method of claim 2, wherein the scale factor B is 0.5.

13. The method of claim 3, wherein the offset value A is 2.

14. The method of claim 5, wherein the scale factor C is 2.

15. The method of claim 7, the offset value D is 0.5.

16. The method of claim 4, wherein the video is to be encoded according to the MPEG-4/H.264 standard, and a change of quantization parameter value for a high activity category is calculated from the equation:

$$\Delta QPHA = \text{Int}\left[-6 * \log\left(\frac{100 - pcLA * 2^{\Delta QPLA/6}}{100 - pcLA}\right)/\log(2) + D\right]$$

wherein D is an offset value and pcLA is a percentage of the total number of macroblocks in the picture of interest assigned to the low activity category.

17. The method of claim 4, wherein for a 16 by 16 macroblock, macroblock activity is calculated using the equation:

$$\text{Activity} = \frac{1}{128}\left[\sum_{x=0}^{14}\sum_{y=0}^{15} |Y_{x,y} - Y_{x+1,y}| + \sum_{x=0}^{15}\sum_{y=0}^{14} |Y_{x,y} - Y_{x,y+1}|\right]$$

wherein $V_{x,y}$ are 8 bit luminance pixel values within a macroblock.

18. The method of claim 4, wherein:
for the case of two activity categories, the low activity category is assigned to 30% of the total number of macroblocks in the picture of interest and the high activity category is assigned to the remaining 70% of the total number of macroblocks in the picture of interest;
or for the case of three activity categories, the low activity category is assigned to 25% of the total number of macroblocks in the picture of interest, the normal activity category is assigned to 10% of the total number of macroblocks in the picture of interest and the high activity category is assigned to the remaining 65% of the total number of macroblocks in the picture of interest.

19. A non-transitory computer-readable medium, carrying instructions, which, when executed, causes computer logic to carry out the method of claim 4.

* * * * *

UNITED STATES PATENT AND TRADEMARK OFFICE
CERTIFICATE OF CORRECTION

PATENT NO. : 8,761,247 B2
APPLICATION NO. : 13/140172
DATED : June 24, 2014
INVENTOR(S) : Bock et al.

It is certified that error appears in the above-identified patent and that said Letters Patent is hereby corrected as shown below:

In the Claims

Column 10, Line 19, in Claim 1, delete "caqtegory," and insert -- category, --, therefor.

Column 11, Line 27, in Claim 11, delete "method claim" and insert -- method of claim --, therefor.

Column 11, Line 31, in Claim 15, delete "the offset" and insert -- wherein the offset --, therefor.

Signed and Sealed this
Third Day of March, 2015

Michelle K. Lee
*Deputy Director of the United States Patent and Trademark Office*